United States Patent [19]

Bordy et al.

[11] Patent Number: 5,118,463
[45] Date of Patent: Jun. 2, 1992

[54] PROCESS AND DEVICE FOR DETECTING UNSEALED FUEL PENCILS IN A FUEL ASSEMBLY BY MEANS OF ULTRASONICS

[75] Inventors: Michel Bordy, Lyons; Pascal Descot, Saint Jean Bonnefonds; Pierre Amiet, Condrieu, all of France

[73] Assignees: Framatome, Courbevoie; Cogema, Velizy, both of France

[21] Appl. No.: 472,234

[22] Filed: Jan. 30, 1990

[30] Foreign Application Priority Data

Jan. 30, 1989 [FR] France .................. 89 01132

[51] Int. Cl.$^5$ .............................................. G21C 17/00
[52] U.S. Cl. ...................................... 376/252; 73/600
[58] Field of Search ......................... 376/252; 73/600

[56] References Cited

U.S. PATENT DOCUMENTS

| | | | |
|---|---|---|---|
| 2,966,056 | 12/1960 | Heller | 73/600 |
| 4,126,514 | 11/1978 | Wonn | 376/252 |
| 4,366,711 | 1/1983 | Weilbacher et al. | 376/252 |
| 4,443,402 | 4/1984 | Marini et al. | 376/252 |
| 4,681,730 | 7/1987 | Beuneche et al. | 376/252 |
| 4,684,493 | 8/1987 | Gravelle | 376/252 |
| 4,828,782 | 5/1989 | Donnelly | 376/252 |

FOREIGN PATENT DOCUMENTS 0018290 4/1980 European Pat. Off. .
0186554 11/1985 European Pat. Off. .
0298387 2/1989 European Pat. Off. .

Primary Examiner—Brooks H. Hunt
Assistant Examiner—Frederick H. Voss
Attorney, Agent, or Firm—Pollock, Vande Sande & Priddy

[57] ABSTRACT

The assembly (1) is immersed in the water of a pool and placed in vertical position. Detection of the rods (6) of the assembly exhibiting cracks giving rise to leakage is ensured by transmission of ultrasonic waves along the length of each of the rods (6) and by measuring the attenuation of the ultrasonic waves due to the presence of water inside the rods (6) whose cladding is cracked. The ultrasonic waves are picked up after propagation on the cladding of the rods (6) of the assembly along their length, below the lower end fitting (5) in place on the assembly (1). The detecting device comprises an ultrasonic transducer (11) capable of transmitting ultrasonic waves along the length of the rod from its upper part, and a receiver probe (16) for the ultrasonic waves, placed under the lower end fitting (5).

4 Claims, 4 Drawing Sheets

PROCESS AND DEVICE FOR DETECTING UNSEALED FUEL PENCILS IN A FUEL ASSEMBLY BY MEANS OF ULTRASONICS

FIELD OF THE INVENTION

The invention relates to a process and a device for detecting unsealed fuel rods in a fuel assembly of a nuclear reactor, by means of ultrasonics.

BACKGROUND OF THE INVENTION

The fuel assemblies of nuclear reactors such as reactors cooled by pressurized water are built in the form of bundles of fuel rods of great length which are held in arrangements where the rods are parallel to each other, by means of a rigid framework closed by two end fittings.

Each of the fuel rods consists of a tubular cladding, generally made of a zirconium alloy containing pellets of sintered fuel material and closed at its ends by sealed plugs, so that the pellets of fuel materials are in contact with an inert gas under pressure, introduced into the cladding.

After a certain time of presence in the nuclear reactor in operation, some rods of the fuel assemblies of the core can become defective as a result of the formation of cracks in their cladding, under the effect of mechanical or chemical stresses to which these fuel rods are subjected.

Cracks passing through the cladding of the faulty fuel rods permit the escape of the gas contained in the cladding, which may contain radioactive products. The reactor cooling water is liable to come into direct contact with the pellets of fuel rods, and this can result in the damage or even in the complete destruction of these pellets and of the fuel rod.

The core fuel assemblies in which one or more fuel rods have leaks must therefore be detected very rapidly.

During the operations of reloading of the core of the nuclear reactor, the fuel assemblies are placed underwater in a pool, before being reloaded into the core or replaced with new assemblies.

Various procedures for monitoring fuel assemblies placed underwater in a pool have been proposed, so as to detect and/or to localize fuel rods exhibiting leaks in these assemblies.

The most commonly used solution consists in placing the assemblies extracted from a nuclear reactor into a cell where these assemblies are heated so that the pressure of the fission gases contained in the fuel rods increases and that these gases escape into the cell through the cracks in the faulty rods. However, this method does not make it possible to identify the defective rods which are to be replaced.

Furthermore, many techniques for detecting fuel pencils exhibiting leaks by means of ultrasonics have been proposed.

In particular, FR-A-2,538,155 discloses a process and a device for detecting defective fuel elements by an ultrasonic absorption method. A train of ultrasonic waves is transmitted in the cladding of the fuel element, from one end of this cladding consisting of a plug, at a frequency and for a duration chosen so that the propagation takes place as Lamb waves. The echoes are detected at the plug from which the ultrasonic waves are transmitted, in the case of different frequencies located in a frequency range, a fraction of which corresponds to a marked absorption by the water which may be present in the cladding and another to a considerable formation of an echo in a mechanical defect in the cladding.

In fact, in the case where a cladding is cracked, the pellets contained in this cladding are in contact with a film of water which seeped into the fuel rod when the pressure of the filling gas became sufficiently low. This film of water surrounding the pellets inside the cladding produces a very considerable attenuation of the Lamb waves in an $S_0$ mode, i.e., of the ultrasonic waves at a frequency such that they propagate in a plate mode within the cladding, in a longitudinal direction.

Insofar as these Lamb waves are only very slightly attenuated by water in which the rod cladding is immersed, or would be similarly attenuated very slightly by water filling the entire internal volume of the cladding, a high attenuation enables the presence of leaks in a fuel rod to be detected with certainty.

However, in the case where the transmission and the sensing of the ultrasonic waves are carried out in contact with the same sealing plug of the rod, generally the plug located at the upper end of the rod, the measured attenuation expresses, above all, the presence of water above the column of fuel pellets and below the plug, in a region where there is a spring retaining the fuel pellets. The detection is therefore not highly sensitive in the case of small-sized cracks, and the detection method must be supplemented by ultrasonic detection of conventional type, using echoes from the mechanical defects in the cladding.

It is possible to employ an ultrasonic transducer placed directly in contact with the upper end of the plugs of each of the rods of the assembly, after disassembly of the upper end fitting, or else ultrasonic transducers fixed to blade-shaped devices called sabers, which can be slid between the rows of fuel rods. In the latter case, there is no need to disassemble the upper end fitting of the assembly.

However, as indicated above, there is a risk that the detection method may lack sensitivity or be tricky to apply and use.

SUMMARY OF THE INVENTION

The object of the invention is therefore a process for detecting unsealed fuel rods by means of ultrasonics in a fuel assembly for a nuclear reactor, consisting of a bundle of mutually parallel rods arranged in a framework closed by two end fittings, the assembly being immersed in the water of a pool and arranged so that the rods are in vertical position and detection of rods whose cladding has cracks giving rise to leaks being ensured by transmission of ultrasonic waves along the length of the rods and by measuring the attenuation of the ultrasonic waves which is due to the presence of water inside the rods whose cladding is cracked, this process being highly sensitive and simple to use.

To this end, the ultrasonic waves are detected after propagation in the cladding of the rods of the assembly along their length, below the lower end fitting in place on the assembly.

The invention also relates to a detecting device permitting the use of the process according to the invention.

BRIEF DESCRIPTION OF THE DRAWINGS

In order that the invention may be more clearly understood, description will now be given, with reference to the appended drawings, of several embodiments of a detecting device and of its use within the scope of the process of detection according to the invention.

DESCRIPTION OF PREFERRED EMBODIMENTS

Figure 1:
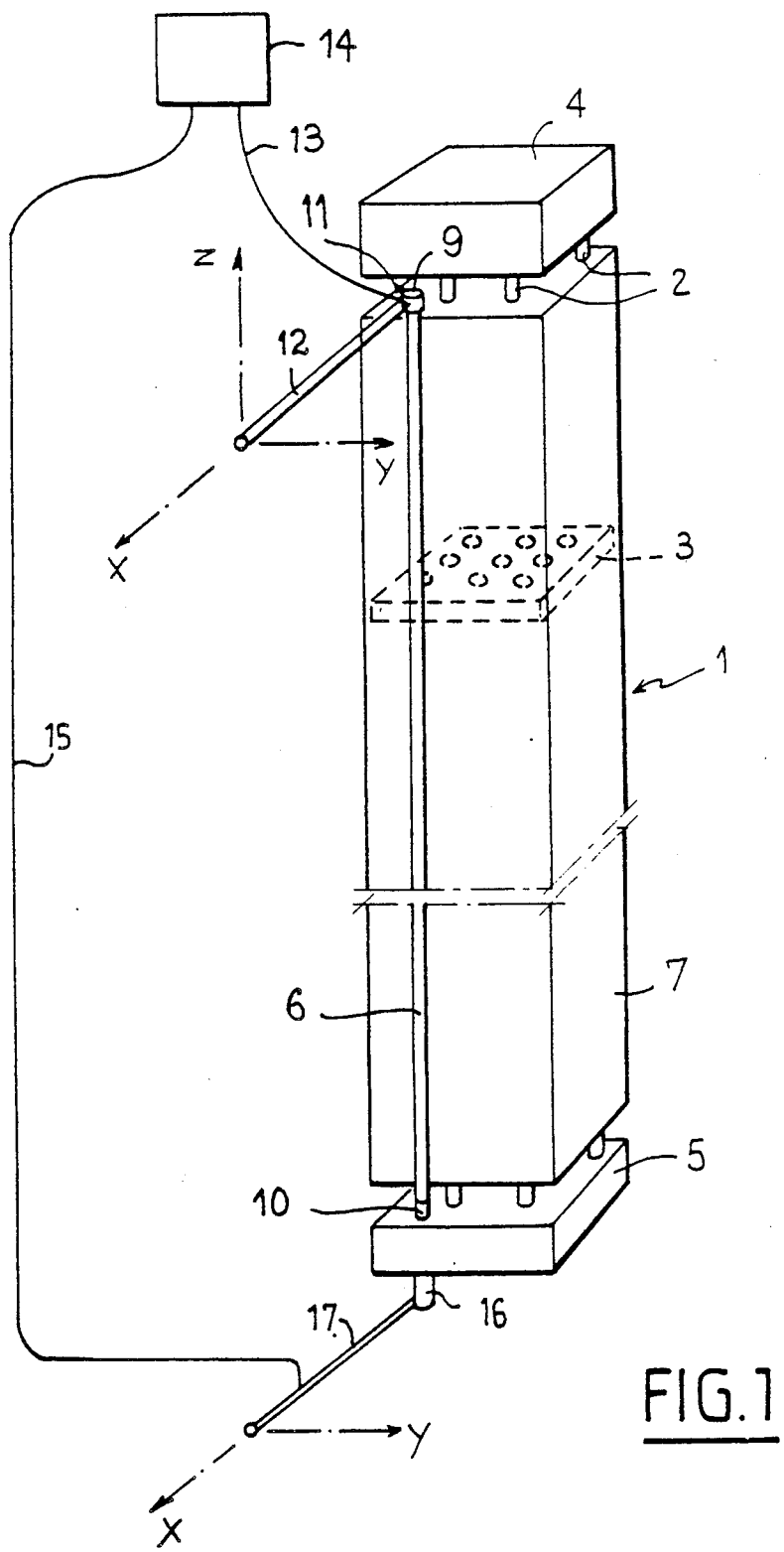
FIG. 1 is a schematic, partly perspective view of a fuel assembly, during an operation of detection of leaks in a fuel rod, according to a first embodiment of the invention.

FIG. 1 shows a fuel assembly 1, comprising a framework consisting chiefly of guide tubes 2, spacer plates 3 and end fittings 4 and 5.

The fuel rods 6 are held by spacer grids 3 to form a bundle of prismatic (square-based) shape, in which the fuel rods 6 are all mutually parallel. The outline of the region of prismatic shape enclosing the bundle of fuel rods 6 is indicated by reference 7.

The fuel rods 6 are shorter than the guide tubes 2, with the result that their upper and lower ends consisting, respectively, of plugs 9 and 10 closing the cladding are at a distance from the lower face of the upper end fitting 4 and from the upper face of the lower end fitting 5.

The process according to the invention can be implemented by means of a device consisting of an arm 12 carrying an ultrasonic transducer 11 at its end and connected to a device for moving along three directions X, Y and Z, making up a trirectangular trihedron. The device for moving the arm 12 (not shown) may consist, for example, of a vertical boom carrying a table with crossed movements, by means of a trolley movable vertically on the boom.

The arm 12 may consist of a carrier arm capable of placing the transducer 11 in contact with the upper surface of the plug 9 after disassembly of the upper end fitting 4 or of a saber capable of placing the transducer 11 in contact with the side surface of the rod 6 in the vicinity of the plug 9.

Devices for positioning an ultrasonic transducer at the end of any fuel rod of an assembly are well known from the prior art and will therefore not be described in detail.

The transducer 11 is powered by means of a cable 13, from an ultrasonic measurement station 14 situated above the level of the pool.

The detecting device which makes it possible to implement the process according to the invention also comprises an ultrasonic receiver probe attached to the end of an arm 17 connected to a device for moving the arm 17 and the probe 16 in two mutually perpendicular horizontal directions X and Y. The device for moving the arm 17 and the probe 16 may consist of a table with crossed movements which is placed at a level slightly below the level of the lower end fitting 5 of the fuel assembly.

To make use of the invention, the fuel assembly may be suspended from the bridge servicing the storage pool for the fuel assemblies, so that its lower end fitting 5 is placed above the end of the arm 17 carrying the ultrasonic receiver probe 16.

The probe 16 is connected by a cable 15 to the ultrasonic measurement station 14.

The arm 17 enables the probe 16 to be moved so that it occupies successively all the positions situated vertically in line with the lower plugs 10 of the fuel rods 6, below the end fitting 5.

In the same way, the probe 11 can be moved so as to come into contact with the upper part of any fuel rod 6 and to transmit into the cladding of such rod, in the lengthwise direction, a train of Lamb waves which are detected by the receiver probe 16 placed vertically below the lower plug 10 of the fuel rod 6 into which the wave train is transmitted.

A measurement of the attenuation of the ultrasonic waves is thus carried out at the measurement station 14, making it possible to detect the possible presence of cracks giving rise to leakages in the rod 6 through whose cladding the ultrasonic waves are being passed.

This method of detection of the waves which are transmitted directly is more sensitive and more certain than prior art methods, requiring reflection of the waves from the lower plug 10 of the rod or the presence of water in the other part of the rod.

Furthermore, the receiver probe 16 can be placed successively vertically below each of the rods 6 of the fuel assembly, without disassembly of the lower end fitting 5.

In the case of conventional end fittings of the fuel assemblies of pressurized water nuclear reactors, the distance between the receiver probe 16 and the lower plug 10 of the rod 6 is of the order of 100 mm, it being possible, however, for this distance to be reduced by the fact that the probe 16 can be introduced inside a hollow part of the end fitting 5, bounded by the feet supporting the assembly.

Figure 2:
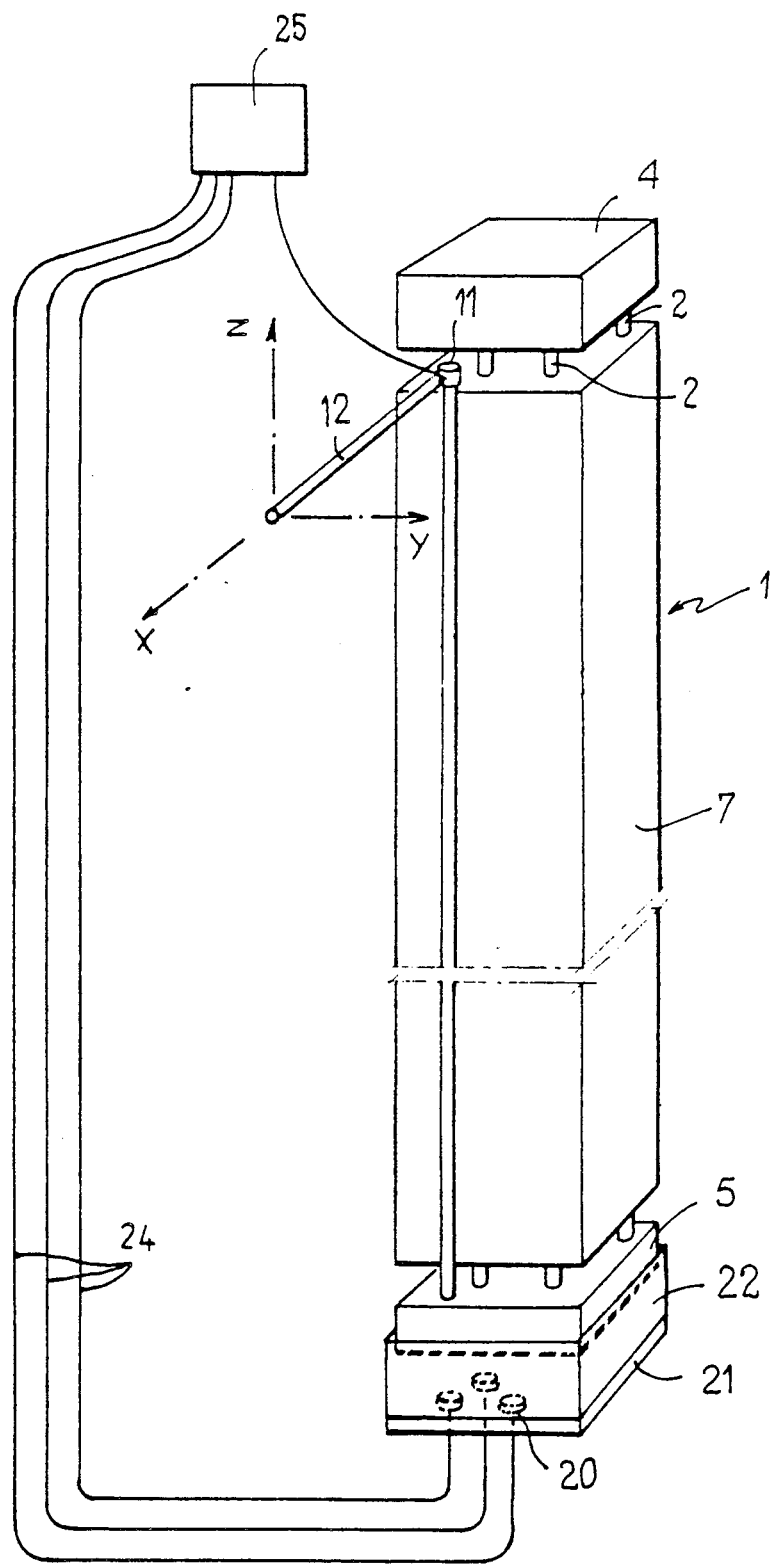
FIG. 2 is a schematic partly perspective view of a fuel assembly during an operation of detection of defective fuel rods, according to a second embodiment of the invention.

FIG. 2 shows a second embodiment of the device for implementation of the process according to the invention, the corresponding elements in FIGS. 1 and 2 bearing the same references.

In contrast to the detection unit shown in FIG. 1, the detection unit shown in FIG. 2 comprises, instead of a single receiver probe carried by a moving arm, a set of receiver probes 20 carried by the bottom 21 of a socket 22 in which the lower end fitting 5 of the fuel assembly 1 can be engaged.

Each of the receiver probes 20 is connected by a cable 24 to a measurement and detection station 25 situated at the upper level of the fuel pool.

As before, the ultrasonic transducer 11 can be moved from the upper end, of a fuel rod 6 to the upper end of another fuel rod, by virtue of a device for moving in the directions X, Y and Z an arm 12 carrying the transducer 11 at its end.

Each of the receiver probes 20 can be associated with one or more fuel rods 6 so as to detect the ultrasonic waves after propagation in the lengthwise direction in the rods 6.

In the case where an attenuation higher than a predetermined limit is recorded, it is concluded therefrom that the rod 6 on which the measurement is carried out has a leakage.

The socket 22 can rest on the bottom of the pool or on a support arranged at some height inside the pool.

The fuel assembly can be suspended from the bridge servicing the pool to allow its lower end fitting 5 to engage in the socket 22.

Figure 3:
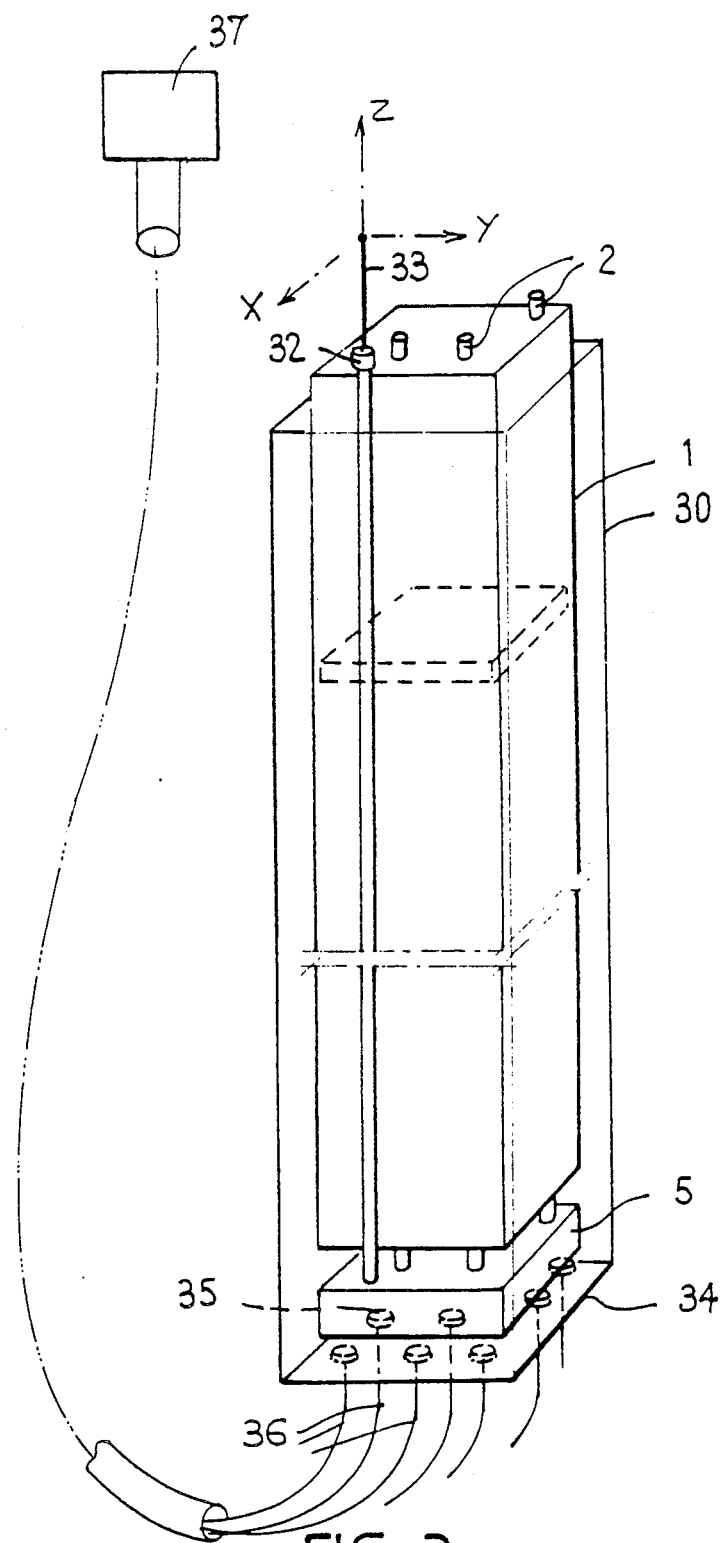
FIG. 3 is a schematic, partly perspective view of a fuel assembly during an operation of detection of defective fuel rods, according to a third embodiment of the invention.

FIG. 3 shows a detection unit according to a third embodiment allowing the process according to the invention to be implemented.

The assembly 1 which is being checked is arranged inside the container 30 of a lowering device allowing the fuel assemblies to be moved from the upper level of the pool to the bottom of the pool. A lowering device of this kind is fastened against a wall of the fuel pool and comprises guide rails on which a trolley moves in the vertical direction. The container 30 is fastened to the trolley and allows a fuel assembly 1 to be received in vertical position.

An ultrasonic transducer 32 is fastened to the end of a vertical arm 33, itself connected to a device for moving in three directions X, Y and Z, direction Z corresponding to the vertical direction and the X and Y directions to two mutually perpendicular horizontal directions.

This device enables the ultrasonic transducer 32 to be moved from the end of a fuel rod 6 consisting of the upper plug of such fuel rod to the upper end of another fuel rod of the assembly. The measurements are performed with the upper end fitting 4 disassembled, so that all the fuel rods 6 are accessible from the upper part of the assembly.

The bottom 34 of the container 30 intended to receive the fuel assembly 1 placed in the lowering device carries a set of receiver probes 35, each connected by a cable 36 to a control and detection station 37 situated above the level of the pool.

The power supply and the control of the transducers 32 and of their moving device are also provided from the control and detection station 37.

Each of the receiver probes 35 is capable of receiving the ultrasonic waves after their propagation along the length of at least one rod 6 of the fuel assembly. The probes 35 are generally fewer in number than the number of rods 6 and are arranged in a uniform pattern, so that each of the probes 35 is capable of detecting the ultrasonic waves originating from a set of rods 6 of the assembly.

Figure 4:
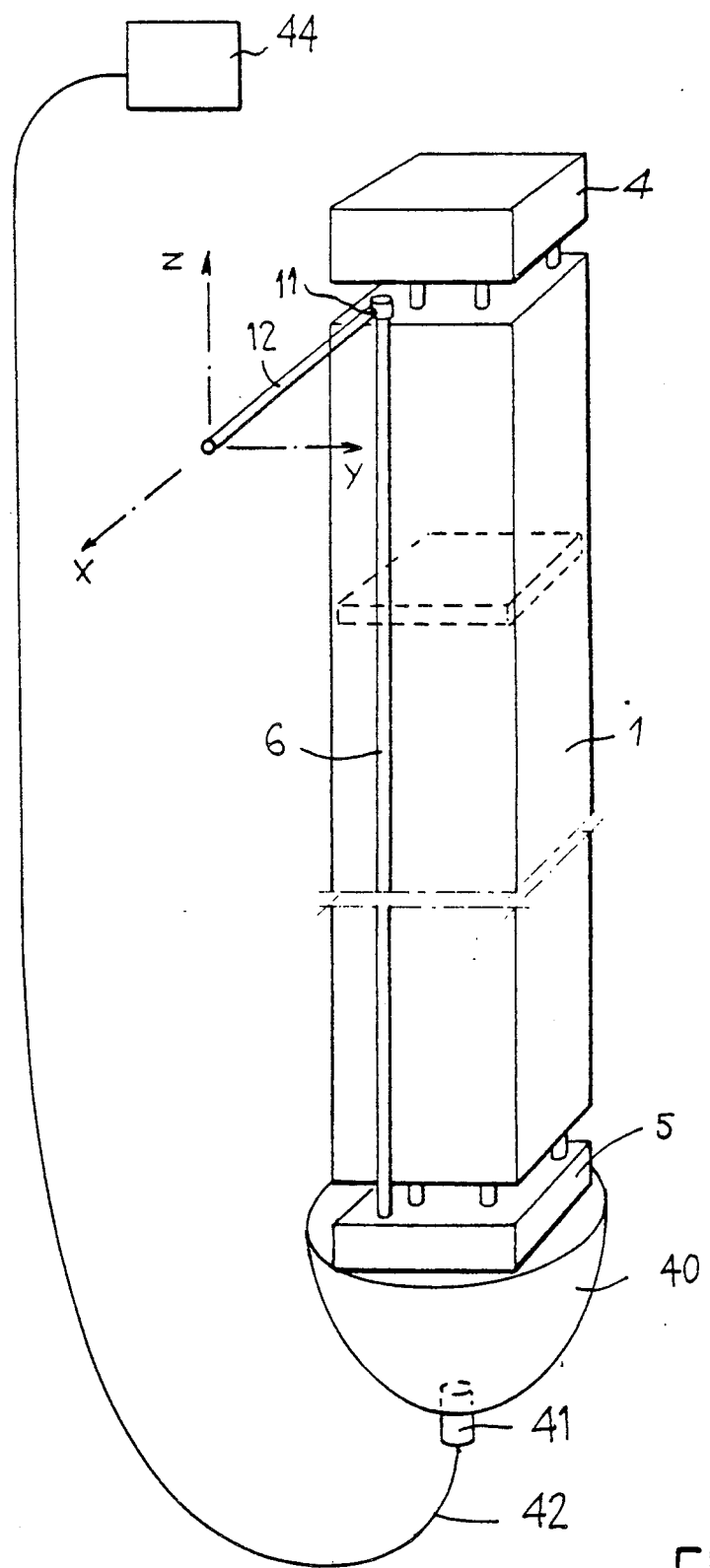
FIG. 4 is a schematic partly perspective view of a fuel assembly during an operation of detection of defective rods, according to a fourth embodiment of the invention.

FIG. 4 shows a detection unit according to a fourth embodiment, the corresponding elements in FIG. 4 and in FIGS. 1, 2 and 3 bearing the same references.

In contrast to the detection units shown in FIGS. 1 and 2, the detection unit shown in FIG. 4 comprises a waveguide 40 of substantially hemispherical shape in the open end part of which the lower end fitting 5 of the assembly is engaged.

A single receiver probe 41 is fastened to the central part of the waveguide 40 and connected by a cable 42 to a measurement and detection station 44 situated above the upper level of the pool.

As in the case of the detection units shown in FIGS. 1 and 2, a transducer 11 fastened to the end of an arm 12 can be moved in the vertical direction Z and in two mutually perpendicular directions X and Y, so that the transducer 11 is placed successively on contact with the upper end plugs of each of the fuel rods 6 of the assembly 1.

The ultrasonic waves are protected, after their propagation in the lengthwise direction of the rods 6, by the receiver probe 41, by virtue of the waveguide device 40.

The measurement signals are transmitted in electrical form by the cable 42 to the control and detection station 44, where the measurement of attenuation of the ultrasonic waves makes it possible to determine the presence of a fuel rods 6 exhibiting leakages, each time the attenuation exceeds a certain predetermined value.

The detection is performed as before in the case of each of the rod of the assembly in succession.

In all cases, the detection is performed in a very certain and highly sensitive manner without disassembly of the lower end fitting 5 of the assembly.

Other arrangements of receiver probes below the lower end fitting of a fuel assembly, which can be suspended by its upper end fitting from a lifting and handling means, and placed on a support at the bottom of the pool or in any moving or supporting device, such as a lowering device, or any other means for handling the assembly.

The waves can be formed into groups in any manner to ensure the detection of the ultrasonic waves originating from the set of fuel rods of the assembly or associated with means of guiding waves making it possible to avoid the use of a large number of waves.

The invention can be applied to the ultrasonic detection of defective fuel rods in the fuel assemblies of any water-cooled nuclear reactor.

We claim:

1. Process for detecting unsealed fuel rods by means of ultrasonics in a fuel assembly for a nuclear reactor, said fuel assembly comprising a bundle of mutually parallel rods (6) arranged in a framework (2, 3, 4, 5) closed by an upper end fitting and a lower end fitting (4, 5), said assembly (1) being immersed in water of a pool and arranged with said rods (6) in substantially vertical position, said process comprising the steps of
   (a) emitting ultrasonic waves in an upper part of said rods;
   (b) transmitting said ultrasonic waves longitudinally of said rods;
   (c) detecting said ultrasonic waves after propagation in said cladding of said rods (6) longitudinally of said rods, below said lower end fitting (5) in place on said assembly (1); and
   (d) measuring an attenuation of said ultrasonic waves due to a presence of water inside certain of said rods (6) having a cracked cladding.

2. Detection process according to claim 1, including transmitting ultrasonic waves successively along the length of each of said fuel rods (6) of said fuel assembly (1), determining an attenuation of said ultrasonic waves for each of successive fuel rods (6), and comparing said attenuation with a predetermined value.

3. Detection process according to claim 2, including moving a single receiver probe (16) below said lower end fitting (5), so as to successively detect ultrasonic waves transmitted in each of said fuel rods (6) of said fuel assembly.

4. Detection process according to claim 2, wherein the ultrasonic waves transmitted successively in each of said fuel rods (6) of said fuel assembly are detected by a probe (20, 35) in a stationary position forming part of a set of probes arranged below said lower end fitting (5) of said fuel assembly (1).

* * * * *